Patented Nov. 9, 1948

2,453,534

UNITED STATES PATENT OFFICE 2,453,534

PROCESS FOR ISOLATION OF GRAMICIDIN

Harold S. Olcott and Heinz L. Fraenkel-Conrat, Berkeley, Calif., assignors to the United States of America as represented by the Secretary of Agriculture No Drawing. Application September 21, 1945, Serial No. 617,913

5 Claims. (Cl. 260—236.5)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

The object of this invention is to provide a method for separating gramicidin from tyrocidine.

Gramicidin is a crystalline antibiotic substance of known composition that can be obtained from cultures of certain strains of Bacillus brevis. Investigators have studied its means of production, separation, crystallization, and biological properties. (Hotchkiss, Advances in Enzymology, vol. 4, Academic Press, New York; Herrell, Penicillin and Other Antibiotic Agents, W. B. Saunders Co., Philadelphia, 1945; Waksman, Microbial Antagonisms and Antibiotic Substances, Commonwealth Fund, New York, 1945.)

The antibiotic product of commerce from which gramicidin is obtained is called tyrothricin, contains two antibiotic substances, gramicidin and tyrocidine. Tyrocidine causes much more rapid hemolysis than does gramicidin. The difference in hemolytic activity between the two furnishes a basis for an in vitro method for analyzing mixtures or for estimating the amount of one in the presence of the other.

Methods are available for the separation of gramicidin from tyrothricin. Hotchkiss (cited above) uses extraction of crude tyrothricin with a mixture of acetone and ethyl ether, followed by crystallization of the gramicidin. Tishler (U. S. Patent No. 2,365,499) extracts gramicidin in a continuous extractor with ethyl ether. The use of phosphotungstic acid for separating gramicidin had the advantage that it can be accomplished quickly, since long-continued extraction with solvents is not necessary. In addition, the separation of gramicidin from the less-desirable tyrothricin appears to be more complete by the phosphotungstic acid procedure than by the acetone-ether extraction procedure.

Our method of separating gramicidin and tyrocidine comprises dissolving the tyrothricin in 95% or absolute ethanol and precipitating the tyrocidine with phosphotungstic acid, which is removed, leaving the gramicidin in solution. Gramicidin is then precipitated from the alcoholic solution by dilution with water and the addition of salt, if necessary, to coagulate the milky suspension. The precipitate contains absorbed or combined phosphotungstic acid which can be removed by washing with dilute alkaline solution. The phosphotungstate ion is unstable in alkaline solution and hydrolyzes to water soluble phosphate and tungstate ions. The final gramicidin product contains less than 5% tyrocidine by the in vitro hemolytic assay test. If further purification is desired, the gramicidin can be crystallized by standard techniques.

The following example will illustrate the procedure more specifically:

Example 50 gm. of tyrothricin is dissolved in 650 ml. of absolute ethanol. Any insoluble material is removed, preferably by centrifugation, and discarded. The tyrocidine is precipitated by the addition of 85 ml. of a 60% solution of phosphotungstic acid in absolute ethanol. The precipitate is separated by centrifugation and washed once with 100 ml. of absolute alcohol. The combined soluble fraction is precipitated by dilution with 4000 ml. of distilled water. If the milky suspension does not separate upon centrifugation, sodium chloride is added until coagulation occurs.

The crude gramicidin precipitate is freed from phosphotungstate by the following method: A suspension in distilled water is brought to about pH 10 by the addition of sodium hydroxide solution, and then permitted to stand overnight. The gramicidin is separated by centrifugation, then washed as often as may be necessary by resuspension in water and centrifugation. In order to coagulate the suspended gramicidin, we have found it convenient to use ammonium carbonate. This salt possesses the advantage of being slowly volatile in the dried state. Traces can, therefore, be removed from the final product by drying to constant weight. As an example of the washing procedure, the wet gramicidin precipitate from 50 gms. of tyrothricin was dissolved by the addition of approximately 75 ml. of absolute ethanol and reprecipitated by the addition of 750 ml. of water. 50 ml. of saturated ammonium carbonate solution was added. Upon centrifugation, the supernatant possessed only very faint turbidity.

The dried gramicidin so prepared amounts to approximately 20—22% of the original tyrothricin. It contains only traces of tyrocidine by the in vitro hemolytic assay method. By nitrogen analysis, tryptophane content and antibiotic activity, it contains approximately 80% of pure gramicidin. The preparation is suitable for obtaining pure gramicidin by crystallization procedures.

Having thus described our invention, we claim:

1. The method of preparing gramicidin, comprising dissolving tyrothricin in alcohol, adding phosphotungstic acid to the solution to precipitate tyrocidine, removing the precipitate and diluting the mother liquor with water to precipitate gramicidin, and removing and purifying the precipitate.

2. The method of separating gramicidin from tyrocidine as they are found in tyrothricin, comprising dissolving the tyrothricin in alcohol, adding to the solution phosphotungstic acid to precipitate the tyrocidine, removing the precipitate from the solution, diluting the mother liquor with water and adding salt to coagulate the gramicidin, and removing and washing the precipitate.

3. The method of separating gramicidin from tyrocidine as they are found in tyrothricin, comprising dissolving the tyrothricin in alcohol, adding to the solution phosphotungstic acid to precipitate the tyrocidine, removing the precipitate from the solution, diluting the mother liquor with water and adding salt to coagulate the gramicidin, and removing and washing the precipitate with a dilute alkaline solution.

4. The method of separating gramicidin from tyrocidine as they are found in tyrothricin, comprising dissolving the tyrothricin in 95 to 100% alcohol, adding to the solution phosphotungstic acid to precipitate the tyrocidine, removing the precipitate from the solution, diluting the mother liquor with water and adding salt to coagulate the gramicidin, subjecting the precipitate to washing with dilute alkaline solution at about pH 10.0 to remove phosphotungstate and washing and drying the precipitate.

5. The method of separating gramicidin from tyrocidine as they are found in tyrothricin, comprising dissolving the tyrothricin in 95 to 100% ethanol, adding to the solution phosphotungstic acid to precipitate the tyrocidine, removing the precipitate from the solution, diluting the mother liquor with water and adding salt to coagulate the gramicidin, subjecting the precipitate to washing with a dilute solution of ammonium carbonate to remove phosphotungstate and washing and drying the precipitate.

HAROLD S. OLCOTT.
HEINZ L. FRAENKEL-CONRAT.

No references cited.